UNITED STATES PATENT OFFICE.

MARCUS T. LOTHROP, OF CANTON, OHIO, ASSIGNOR TO THE TIMKEN ROLLER BEARING COMPANY, OF CANTON, OHIO, A CORPORATION OF OHIO.

PROCESS OF IMPROVING THE MACHINING PROPERTIES OF STEEL.

1,360,551. Specification of Letters Patent. Patented Nov. 30, 1920.

No Drawing. Application filed October 20, 1919. Serial No. 332,007.

*To all whom it may concern:*

Be it known that I, MARCUS T. LOTHROP, a citizen of the United States, and a resident of the city of Canton, in the county of Stark and State of Ohio, have invented a new and useful Improvement in Processes of Improving the Machining Properties of Steel, of which the following is a specification.

My invention relates to the manufacture of steel intended for machining and has for its principal object to produce a steel that is better suited for machining operations than steel of like composition manufactured by the ordinary process. The invention consists mainly in rolling the steel at a temperature of substantially 200 degrees Fahrenheit or more above the temperature ordinarily used for the rolling of steel of like chemical composition.

Heretofore it has been the practice to roll steel rods intended for machining at a comparatively low temperature, that is at 2000 degrees Fahrenheit to 2220 degrees Fahrenheit. I have found that with a given composition of steel, its machining qualities are greatly improved by rolling at a higher temperature than is customary in practice. My process is especially adapted for alloy steel, which, when rolled according to ordinary practice, produces stock which is difficult to machine due to the toughness imparted to the steel by the alloy.

According to my invention, steel is made by the usual process, except that the temperature to which the steel billets are heated when they leave the furnace for their final hot working operation is from 200 to 300 degrees Fahrenheit higher than usual. I have found that stock for the automatic screw machines when made by my process is greatly superior, so far as machining properties are concerned, to stock made by the ordinary process. Rolling at a temperature in excess of 2300 degrees has the effect of reducing the toughness and thus increasing the brittleness of the steel as compared with steel of the same hardness rolled at the lower temperature customary at the present time. By reason of this reduced toughness, the product is much more easily worked on with cutting tools and is much better adapted for machining than the product of the same chemical composition rolled at the lower temperature.

What I claim is:

The process of improving the machining properties of rolled steel which comprises the hot working of the same at a temperature above 2300 degrees Fahrenheit.

Signed at Canton, Ohio, this 15th day of October, 1919.

MARCUS T. LOTHROP.